United States Patent
Bolger et al.

(10) Patent No.: US 11,745,737 B2
(45) Date of Patent: Sep. 5, 2023

(54) GRADE-COMPENSATED TORQUE PRODUCTION TO PROPEL VEHICLE DURING ONE-PEDAL DRIVE

(71) Applicant: Ford Global Technologies, LLC, Dearborn, MI (US)

(72) Inventors: Bryan Michael Bolger, Canton, MI (US); Sergey Gennadievich Semenov, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 183 days.

(21) Appl. No.: 17/028,067

(22) Filed: Sep. 22, 2020

(65) Prior Publication Data

US 2022/0089154 A1 Mar. 24, 2022

(51) Int. Cl.
*B60W 30/14* (2006.01)
(52) U.S. Cl.
CPC ....... *B60W 30/143* (2013.01); *B60W 2540/10* (2013.01)

(58) Field of Classification Search
CPC ................. B60W 30/143; B60W 2540/10
See application file for complete search history.

(56) References Cited

U.S. PATENT DOCUMENTS

| 2016/0318501 | A1  | 11/2016 | Oldridge |
|---|---|---|---|
| 2017/0174220 | A1  | 6/2017 | Puri et al. |
| 2020/0377096 | A1* | 12/2020 | Park ............... B60W 40/076 |

OTHER PUBLICATIONS

Fernie, Michael, How Does Wheel Size Affect Performance?,2016, CarThrottle.com, p. 2 (Year: 2016).*

* cited by examiner

*Primary Examiner* — Alan D Hutchinson
*Assistant Examiner* — Andy Schneider
(74) *Attorney, Agent, or Firm* — David B. Kelley; Brooks Kushman P.C.

(57) ABSTRACT

A vehicle includes a powertrain and a controller. The controller, responsive to a parameter indicative of a grade on which the vehicle is travelling having a value greater than a threshold, and a given accelerator pedal input, commands the powertrain to produce an amount of drive torque for the vehicle that is based on the value.

12 Claims, 4 Drawing Sheets

62

Responsive to a speed of the vehicle being less than a speed threshold and a given accelerator pedal input, commanding the powertrain to produce a first amount of drive torque for the vehicle based on a difference between an acceleration of the vehicle derived from a rotational speed sensor of the powertrain and an acceleration of the vehicle derived from an accelerometer.

64

Responsive to the speed being less than the speed threshold, the difference being greater than the difference threshold, and the given accelerator pedal input, command the powertrain to produce a second amount of drive torque for the vehicle that is based on the difference such that the first amount is less than the second amount when the vehicle is travelling uphill and the first amount is greater than the second amount when the vehicle is travelling downhill. The second amount of drive torque is further based on a tire radius of the vehicle. The second amount of drive torque is further based on a mass of the vehicle.

66

Responsive to the speed of the vehicle being greater than a second speed threshold and the given accelerator pedal input, command the powertrain to produce a third amount of drive torque that is not based on the difference, wherein the second speed threshold is greater than the first speed threshold.

Responsive to a speed of the vehicle being less than a speed threshold, a difference between an acceleration of the vehicle derived from a rotational speed sensor of the powertrain and an acceleration of the vehicle derived from an accelerometer being less than a difference threshold, and a given accelerator pedal input, command the powertrain to produce a first amount of drive torque for the vehicle that is not based on the difference. The first amount of drive torque is further based on a tire radius of the vehicle.

70

Responsive to the speed of the vehicle being greater than a second speed threshold and the given accelerator pedal input, commanding the powertrain to produce a second amount of drive torque that is not based on the difference, wherein the second speed threshold is greater than the first speed threshold. The first amount of drive torque is further based on a mass of the vehicle.

Responsive to a difference between an acceleration of the vehicle derived from a rotational speed sensor of the powertrain and an acceleration derived from an accelerometer being greater than a difference threshold, and a given accelerator pedal input, command the powertrain to produce a first amount of drive torque for the vehicle that is based on the difference. The first amount of drive torque is further based on a tire radius of the vehicle. The first amount of drive torque is further based on a mass of the vehicle.

Fig. 5

GRADE-COMPENSATED TORQUE PRODUCTION TO PROPEL VEHICLE DURING ONE-PEDAL DRIVE

TECHNICAL FIELD

This disclosure relates to control of a vehicle during so-called one pedal driving.

BACKGROUND

The powertrain of a vehicle with an electric generator/motor may consume energy to propel the vehicle forward and generate energy to slow or stop the vehicle. This regenerative braking captures kinetic energy associated with movement of the vehicle and transforms it into electrical energy for storage in a battery.

In one pedal driving mode, a driver may not need to press the brake pedal to bring the vehicle to a stop. Just as pressing the accelerator pedal may cause the motor to propel the vehicle forward, releasing the accelerator pedal may cause the generator to regeneratively brake the vehicle—without use of the friction brakes.

SUMMARY

A vehicle includes a powertrain and a controller. The controller, responsive to a speed of the vehicle being less than a speed threshold, a difference between an acceleration of the vehicle derived from a rotational speed sensor of the powertrain and an acceleration of the vehicle derived from an accelerometer being less than a difference threshold, and a given accelerator pedal input, commands the powertrain to produce a first amount of drive torque for the vehicle that is not based on the difference. The controller further, responsive to the speed being less than the speed threshold, the difference being greater than the difference threshold, and the given accelerator pedal input, commands the powertrain to produce a second amount of drive torque for the vehicle that is based on the difference such that the first amount is less than the second amount when the vehicle is travelling uphill and the first amount is greater than the second amount when the vehicle is travelling downhill.

A method for controlling a vehicle includes, responsive to a speed of the vehicle being less than a speed threshold and a given accelerator pedal input, commanding a powertrain to produce a first amount of drive torque for the vehicle based on a difference between an acceleration of the vehicle derived from a rotational speed sensor of the powertrain and an acceleration of the vehicle derived from an accelerometer.

A vehicle includes a powertrain and a controller. The controller, responsive to a difference between an acceleration of the vehicle derived from a rotational speed sensor of the powertrain and an acceleration derived from an accelerometer being greater than a difference threshold, and a given accelerator pedal input, commands the powertrain to produce a first amount of drive torque for the vehicle that is based on the difference.

BRIEF DESCRIPTION OF THE DRAWINGS

FIGS. 3, 4, and 5 are flow charts of algorithms for controlling torque production.

DETAILED DESCRIPTION

Figure 1:
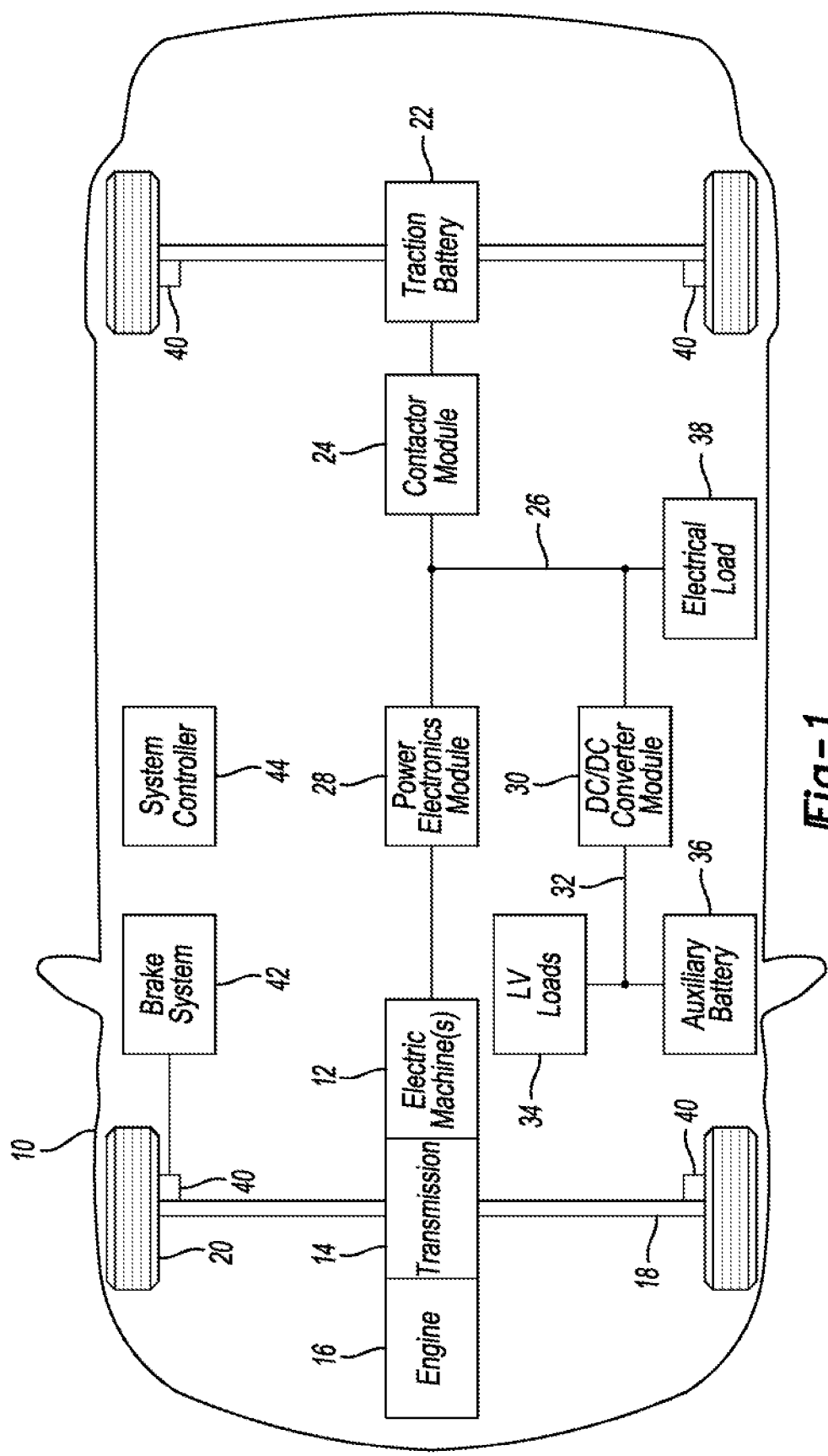
FIG. 1 is a schematic diagram of a vehicle.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A low speed controller for a one pedal drive system may adjust an accelerator pedal driver demand map using a speed based feedback controller and a grade compensating feedforward controller. Such feedforward control may be decomposed into three elements: estimating the effect of road grade, calculating the extra torque required for the grade, and then scheduling that torque into the low speed controller.

Estimating the effect of road grade may be performed by comparing two longitudinal vehicle acceleration signals: one that is derived from drivetrain rotational speed (not subject to gravitational effects) and the other being derived from an accelerometer (subject to gravitational effects). Each of these signals may have a unique amount of low pass filtering applied, but lightly filtered so as to not induce time lag. By subtracting the accelerometer based signal from the rotational speed based signal, the acceleration component due to gravity can be inferred.

The extra torque needed to compensate for the effect of road grade may be calculated using a calibrated input for vehicle mass and tire radius inputs programmed from body controls for example. The extra torque represents the estimated amount of wheel torque needed to hold the vehicle stationary on a grade.

(extra torque)=(vehicle mass)×(difference in accelerations)×(tire radius)

Vehicle mass may be calibrated to a weight close to curb weight plus one passenger. The actual operating mass of the vehicle may be unknown. The vehicle mass may thus be calibrated low (vs high) such that less extra torque is scheduled in the feedforward component. Another uniquely calibrated rolling average filter may then be applied to the extra torque signal to remove transient noise (e.g., gear lash, road bumps, etc.).

The filtered extra torque may be inverted and scheduled into the one pedal drive low speed controller based on vehicle speed. This torque may be clipped to a maximum calibrated value. This constitutes the feedforward component of the low speed controller, or the grade compensating feedforward controller. The feedforward component may be zero for speeds higher than some calibrated speed (e.g., 20 miles per hour) and will be linearly ramped into applying the full grade compensation (up to the calibrated torque limit) as speed lowers to another calibratable speed (e.g., 10 miles per hour). Below the lower calibratable speed (e.g., 10 miles per hour), the full amount of grade compensating torque (up to the calibrated limit) may be applied. This torque may be scheduled independent of whether the feedback controls are active or not, but speed thresholds may be calibrated in concert with the feedback controller the feedforward term may be nearly fully applied at the maximum speed that feedback controls can operate. Because this may simply be speed dependent, the feedforward component may also be present when the driver tips in to accelerate again. This compensation may help normalize the acceleration feel provided for a given accelerator input for a wide range of grades in one pedal drive.

With reference to FIG. 1, electrified vehicle 10 may include one or more electric machines 12 mechanically coupled to a gearbox or hybrid transmission 14. The electric machines 12 may operate as a motor and a generator. In addition, the hybrid transmission 14 is mechanically coupled to an engine 16. The hybrid transmission 14 is also mechanically coupled to a drive shaft 18 that is mechanically coupled to wheels 20. The electric machines 12 can provide propulsion and regenerative braking capability when the engine 16 is on or off, and allow the vehicle 10 to be operated in electric mode with the engine 16 off under certain conditions. The vehicle 10, in other arrangements, may lack the engine 16 (e.g., a battery electric vehicle). Other architectures are also contemplated.

A battery pack or traction battery 22 stores energy that can be used by the electric machines 12. The traction battery 22 may provide a high voltage direct current (DC) output. A contactor module 24 may include one or more contactors configured to isolate the traction battery 22 from a high voltage bus 26 when opened and connect the traction battery 22 to the high voltage bus 26 when closed. The high voltage bus 26 may include power and return conductors for carrying current. One or more power electronics modules 28 (e.g., inverters) may be electrically coupled to the high voltage bus 26. The power electronics modules 28 are also electrically coupled to the electric machines 12 and provide the ability to bi-directionally transfer energy between the traction battery 22 and the electric machines 12. For example, the traction battery 22 may provide a DC voltage while the electric machines 12 may operate with a three phase alternating current (AC) to function. The power electronics module 28 may convert the DC voltage to three phase AC current to operate the electric machines 12. In regenerative mode, the power electronics module 28 may convert the three phase AC current from the electric machines 12 acting as generators to DC voltage compatible with the traction battery 22.

In addition to providing energy for propulsion, the traction battery 22 may provide energy for other vehicle electrical systems. The vehicle 10 may include a DC/DC converter module 30 that converts the high voltage DC output from the high voltage bus 26 to a low voltage DC level of a low voltage bus 32 that is compatible with low voltage loads 34. An output of the DC/DC converter module 30 may be electrically coupled to an auxiliary battery 36 (e.g., 12V battery) for charging the auxiliary battery 36. The low voltage loads 34 may be electrically coupled to the auxiliary battery 36 via the low voltage bus 32. One or more high voltage electrical loads 38 may be coupled to the high voltage bus 26. The high voltage electrical loads 38 may have an associated controller that operates and controls the high voltage electrical loads 38 when appropriate. Examples of high voltage electrical loads 38 include a fan, an electric heating element, an air conditioning compressor, etc.

Wheel brakes 40 may be provided for braking and preventing motion of the vehicle 10. The wheel brakes 40 may be hydraulically actuated, electrically actuated, or some combination thereof. The wheel brakes 40 may be a part of a brake system 42. The brake system 42 may include other components to operate the wheel brakes 40. For simplicity, FIG. 1 depicts a single connection between the brake system 42 and one of the wheel brakes 40. A connection between the brake system 42 and the other wheel brakes 40 is implied. The brake system 42 may include a controller to monitor and coordinate its activities. The brake system 42 may monitor the brake components and control the wheel brakes 40. The brake system 42 may respond to driver commands and may also operate autonomously to implement features such as stability control. The controller of the brake system 42 may implement a method of applying a requested brake force when requested by another controller or sub-function.

Electronic modules in the vehicle 10 may communicate via one or more vehicle networks. The vehicle networks may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE)802 family of standards. Additional channels of the vehicle network may include discrete connections between modules and may include power signals from the auxiliary battery 36. Different signals may be transferred over different channels of the vehicle network. For example, video signals may be transferred over a high speed channel (e.g., Ethernet) while control signals may be transferred over CAN or discrete signals. The vehicle network may include any hardware and software components that aid in transferring signals and data between modules. The vehicle network is not shown in FIG. 1, but it may be implied that the vehicle network may connect to any electronic modules that are present in the vehicle 10.

A vehicle system controller (VSC) 44 may be present to coordinate the operation of the various components, and execute or cause the algorithm described below to be executed by another controller.

Figure 2:
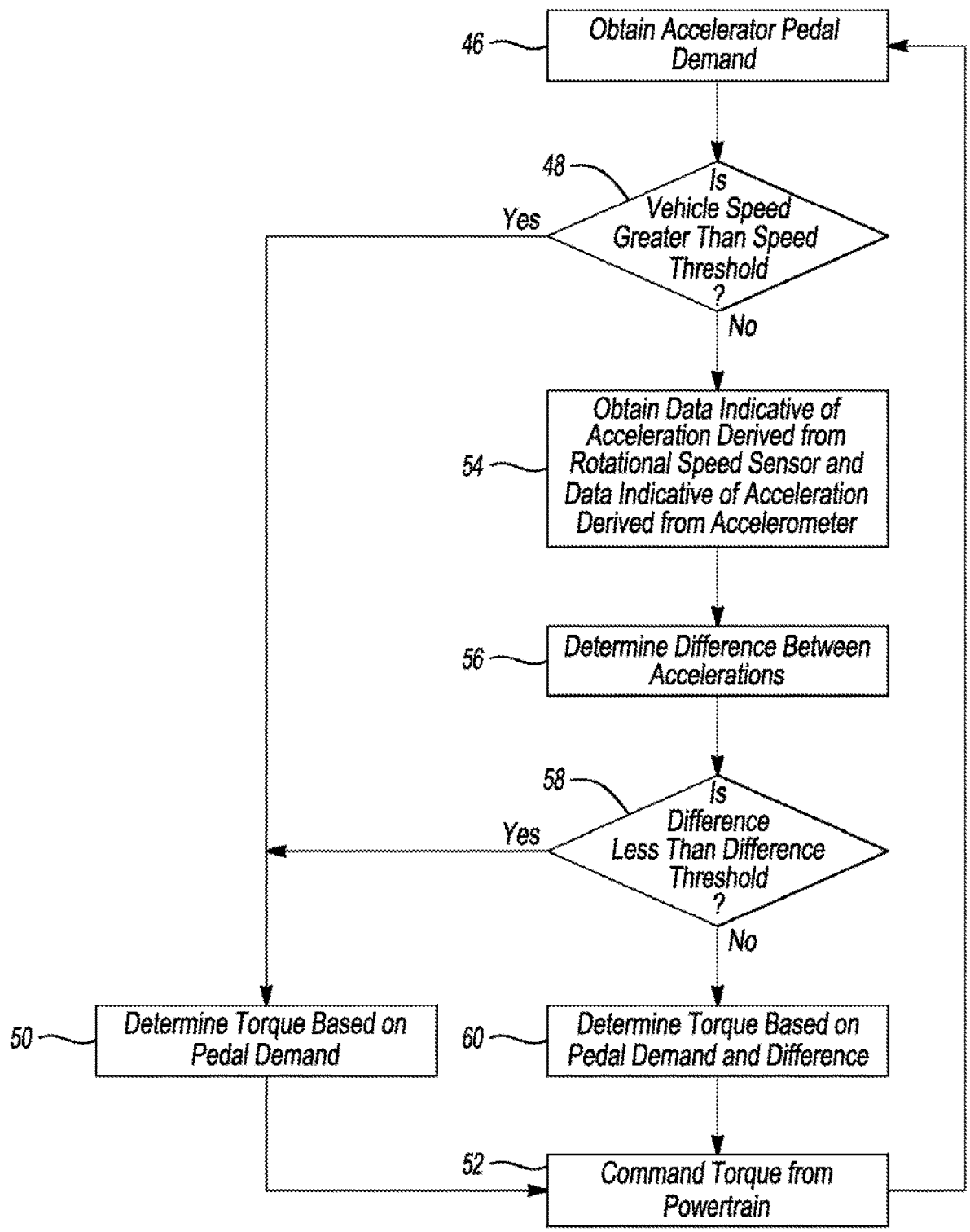
FIG. 2 is a flow chart of an algorithm for controlling torque production in the vehicle of FIG. 1.

With reference to FIG. 2, accelerator pedal demand is obtained at operation 46. Accelerator pedal position, for example, may be examined to determine pedal demand. At decision block 48, it is determined whether vehicle speed is greater than a speed threshold. For example, vehicle speed derived from a wheel speed sensor may be compared against a speed threshold. If yes, torque is determined based on the accelerator pedal demand at operation 50. A map, for example, relating accelerator pedal position to torque may be inspected. At operation 52, the torque is commanded from the powertrain. For example, electric machine command signals may be generated that cause electric machine torque production. Returning to operation 48, if no, data indicative of acceleration derived from a rotational speed sensor and data indicative of acceleration derived from an accelerometer is obtained at operation 54. Data, for example, from respective wheel speed and acceleration sensors may be obtained via network connections. At operation 56, the difference between the accelerations is determined. An acceleration value derived from a wheel speed sensor may be effectively subtracted from an acceleration value derived from an accelerometer, for example. At operation 58, it is determined whether the difference is less than a difference threshold. The difference, for example, may be compared against a difference threshold. If yes, the algorithm proceeds to operation 50. If no, torque is determined based on the accelerator pedal demand and the difference. For example, a map relating accelerator pedal position and difference to torque may be inspected. The algorithm then proceeds to operation 52.

With reference to FIG. 3, at operation 62, a controller can, responsive to a speed of the vehicle being less than a speed threshold and a given accelerator pedal input, commanding the powertrain to produce a first amount of drive torque for the vehicle based on a difference between an acceleration of the vehicle derived from a rotational speed sensor of the powertrain and an acceleration of the vehicle derived from an accelerometer. At operation 64, a controller can, responsive to the speed being less than the speed threshold, the difference being greater than the difference threshold, and the given accelerator pedal input, command the powertrain to produce a second amount of drive torque for the vehicle that is based on the difference such that the first amount is less than the second amount when the vehicle is travelling uphill and the first amount is greater than the second amount when the vehicle is travelling downhill. The second amount of drive torque is further based on a tire radius of the vehicle. the second amount of drive torque is further based on a mass of the vehicle. At operation 66, a controller can, responsive to the speed of the vehicle being greater than a second speed threshold and the given accelerator pedal input, command the powertrain to produce a third amount of drive torque that is not based on the difference, wherein the second speed threshold is greater than the first speed threshold.

With reference to FIG. 4, at operation 68, a controller can, responsive to a speed of the vehicle being less than a speed threshold, a difference between an acceleration of the vehicle derived from a rotational speed sensor of the powertrain and an acceleration of the vehicle derived from an accelerometer being less than a difference threshold, and a given accelerator pedal input, command the powertrain to produce a first amount of drive torque for the vehicle that is not based on the difference. The first amount of drive torque is further based on a tire radius of the vehicle. At operation 70, responsive to the speed of the vehicle being greater than a second speed threshold and the given accelerator pedal input, commanding the powertrain to produce a second amount of drive torque that is not based on the difference, wherein the second speed threshold is greater than the first speed threshold. The first amount of drive torque is further based on a mass of the vehicle.

With reference to FIG. 5, at operation 72, a controller can, responsive to a difference between an acceleration of the vehicle derived from a rotational speed sensor of the powertrain and an acceleration derived from an accelerometer being greater than a difference threshold, and a given accelerator pedal input, command the powertrain to produce a first amount of drive torque for the vehicle that is based on the difference. The first amount of drive torque is further based on a tire radius of the vehicle. The first amount of drive torque is further based on a mass of the vehicle.

If grade compensation is not performed in one pedal drive, stopping profiles for uphill and downhill travel may be dependent on the feedback controller only and may vary. The feedback controller may be reactive and require speed error to accumulate, so performance may degrade if no feedforward compensation is performed. Utilizing a grade based feedforward component allows for stopping on grades and may make the deceleration profile and stopping feel consistent for a wide range of common grades. Applying feedforward grade compensation may also help to normalize the accelerator pedal feel when launching from a stop on grade. Without this compensation, launching a vehicle pointing downhill may provide more acceleration than desired for low pedal inputs. Launching the vehicle uphill may require the driver to push much further into the accelerator pedal before the vehicle begins to accelerate forward.

Control logic or functions performed by one or more controllers may be represented by flow charts or similar diagrams in any of the various figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but are provided for ease of illustration and description.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a powertrain; and
a controller programmed to,
responsive to a speed of the vehicle being less than a speed threshold, a difference between an acceleration of the vehicle derived from a rotational speed sensor of the powertrain and an acceleration of the vehicle derived from an accelerometer being less than a difference threshold, and a given accelerator pedal input, command the powertrain to produce a first amount of drive torque for the vehicle that is not based on the difference, and
responsive to the speed being less than the speed threshold, the difference being greater than the difference threshold, and the given accelerator pedal input, command the powertrain to produce a second amount of drive torque for the vehicle that is based on the difference such that the first amount is less than the second amount when the vehicle is travelling uphill and the first amount is greater than the second amount when the vehicle is travelling downhill.

2. The vehicle of claim 1, wherein the controller is further programmed to, responsive to the speed of the vehicle being greater than a second speed threshold and the given accelerator pedal input, command the powertrain to produce a third amount of drive torque that is not based on the difference, wherein the second speed threshold is greater than the first speed threshold.

3. The vehicle of claim 2, wherein the controller is further programmed to, responsive to the speed of the vehicle being between the first and second speed thresholds, the difference being greater than the difference threshold, and the given accelerator pedal input, command the powertrain to produce a fourth amount of drive torque that is based on a portion of the difference proportional to a difference between the speed of the vehicle and the first or second speed threshold, wherein the second speed threshold is greater than the first speed threshold.

4. The vehicle of claim 1, wherein the second amount of drive torque is further based on a tire radius of the vehicle.

5. The vehicle of claim 1, wherein the second amount of drive torque is further based on a mass of the vehicle.

6. A method for controlling a vehicle including a powertrain, comprising:
by a controller,
responsive to a speed of the vehicle being less than a first speed threshold and a given accelerator pedal input, commanding the powertrain to produce a first amount of drive torque for the vehicle based on a difference between an acceleration of the vehicle derived from a rotational speed sensor of the powertrain and an acceleration of the vehicle derived from an accelerometer,
responsive to the speed of the vehicle being greater than a second speed threshold and the given accelerator pedal input, commanding the powertrain to produce a second amount of drive torque that is not based on the difference, wherein the second speed threshold is greater than the first speed threshold, and
responsive to the speed of the vehicle being between the first and second speed thresholds and the given accelerator pedal input, commanding the powertrain to produce a third amount of drive torque that is based on a portion of the difference proportional to a difference between the speed of the vehicle and the first or second speed threshold.

7. The method of claim 6, wherein the first amount of drive torque is further based on a tire radius of the vehicle.

8. The vehicle of claim 6, wherein the first amount of drive torque is further based on a mass of the vehicle.

9. A vehicle comprising:
a powertrain; and
a controller programmed to,
responsive to a difference between an acceleration of the vehicle derived from a rotational speed sensor of the powertrain and an acceleration derived from an accelerometer being greater than a difference threshold, and a given accelerator pedal input, command the powertrain to produce a first amount of drive torque for the vehicle that is based on the difference, and
responsive to the difference being less than the difference threshold, and the given accelerator pedal input, command the powertrain to produce a second amount of drive torque for the vehicle that is not based on the difference such that the first amount is greater than the second amount when the vehicle is travelling uphill and the first amount is less than the second amount when the vehicle is travelling downhill.

10. The vehicle of claim 9, wherein the controller is further programmed to, responsive to the speed of the vehicle being greater than a speed threshold and the given accelerator pedal input, command the powertrain to produce a third amount of drive torque that is not based on the difference.

11. The vehicle of claim 9, wherein the first amount of drive torque is further based on a tire radius of the vehicle.

12. The vehicle of claim 9, wherein the first amount of drive torque is further based on a mass of the vehicle.

* * * * *